(12) United States Patent
Jang (10) Patent No.: US 11,446,769 B2
(45) Date of Patent: Sep. 20, 2022

(54) LASER CUTTING APPARATUS AND METHOD AND METHOD OF MANUFACTURING DISPLAY PANEL BY USING LASER CUTTING METHOD

(71) Applicant: SAMSUNG DISPLAY CO., LTD., Yongin-si (KR)

(72) Inventor: Joonyung Jang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 551 days.

(21) Appl. No.: 16/250,280

(22) Filed: Jan. 17, 2019

(65) Prior Publication Data

US 2019/0314935 A1   Oct. 17, 2019

(30) Foreign Application Priority Data

Apr. 11, 2018   (KR) .................. 10-2018-0042195

(51) Int. Cl.
*B23K 26/38*   (2014.01)
*B23K 26/146*   (2014.01)
(Continued)

(52) U.S. Cl.
CPC ............ *B23K 26/38* (2013.01); *B23K 26/146* (2015.10); *B23K 26/40* (2013.01); *B23K 2103/172* (2018.08)

(58) Field of Classification Search
CPC .............. B23K 26/083; B23K 26/0619; B23K 26/0604; B23K 26/0624; B23K 26/53;
(Continued)

(56) References Cited

U.S. PATENT DOCUMENTS 8,835,803 B2 * 9/2014 Lim ................... B23K 26/38
                                                 219/121.72
9,296,066 B2   3/2016 Hosseini et al.
(Continued)

FOREIGN PATENT DOCUMENTS

CN   105328330 A   2/2016
KR   10-1097324 B1   12/2011
(Continued)

OTHER PUBLICATIONS

A. Braun, et al., "Self-channeling of high-peak-power femtosecond laser pulses in air," Optics Letters, vol. 20, No. 1, Jan. 1, 1995, pp. 73-75.
(Continued)

*Primary Examiner* — Joel M Attey
*Assistant Examiner* — Rachel R Rizzo
(74) *Attorney, Agent, or Firm* — Lewis Roca Rothgerber Christie LLP (57) ABSTRACT

A laser cutting apparatus and method, and a method of manufacturing a display panel by using a laser cutting method are provided. A laser cutting method includes: providing a panel in which a second substrate is stacked on a first substrate including a conductive wiring; and removing a portion of the second substrate to expose the conductive wiring by emitting a laser beam to the second substrate, and the laser beam is emitted to the second substrate at an incident angle equal to or greater than a threshold angle at which total reflection occurs in the second substrate.

12 Claims, 5 Drawing Sheets

(51) Int. Cl.
   *B23K 26/40*   (2014.01)
   *B23K 103/16*  (2006.01)
(58) Field of Classification Search
   CPC ............. B23K 26/402; B23K 26/362; B23K
      26/0006; B23K 26/0648; B23K 26/0622;
      B23K 26/032; B23K 26/0869; B23K
      26/0608; B23K 26/361; B23K 26/0676;
      B23K 26/38; B23K 26/146; B23K 26/40;
      B23K 2103/172; B23K 26/0652; C03C
      23/0025; C03B 33/0222; H01L 21/2633;
      H01L 27/1222; H01L 27/1237; H01L
      27/1262; H01L 27/1225; H01L 27/1259;
      H01L 27/1218; H01L 21/67092; H01L
      51/5012; H01L 33/50; H01L 33/507;
      H01L 33/42; H01L 27/32; H01L 51/0001;
      H01L 51/0097; H01L 51/003; H01L
      51/56; H01L 33/505; H01L 33/60; H01L
      33/0045; H01L 33/20; B26F 3/00; H05B
      33/04; H05B 33/10; H05B 33/12; H05B
      33/14; H05B 33/02; H05B 33/22; G02F
      1/136213; G02F 1/133371; G02F
      1/13624; G02F 1/134363; G02F
      1/133553; G02F 1/136286; G02F
      1/133504; G02F 1/1368; G02F 1/29;
      G02F 1/137; G02F 1/13354; G02F
      1/133555; G02F 1/13338; G02F
      1/133524; G02F 1/1326; G02F 1/011;
      G02B 5/3041; G02B 27/28; G02B 1/115;
      G02B 5/3066; G02B 5/30; G02B 1/11;
      G02B 6/0046; G02B 6/0016; G02B
      6/0068; G02B 6/0063; G02B 6/0043;
      G02B 5/0247; G02B 6/0076; G02B
      30/26; G02B 6/001; G02B 6/0006; G02B
      5/0242; G02B 5/0278; G02B 5/0221;
      G02B 6/0073; G02B 5/045; G02B
      6/0041; F21V 5/002; F21V 9/14; F21V
      9/08; F21V 9/40; F21V 13/02; F21V
      13/14; G09F 13/18; G09F 1/136286;
      G09G 3/3607; G09G 3/3225; B29C
      59/16; F21K 9/61; H01S 5/4056; H01S
      5/0225; H01S 5/0087; H01S 5/02325;
      H01S 5/02255; H01S 5/22; H01S 5/10;
      H01S 5/4031; H01S 5/2231; C09K
      11/7736; C09K 11/7734; G06F 3/042;
      G06F 3/0412; H04N 9/3105; H01J 61/35;
      G01C 3/08; G01C 3/10
   See application file for complete search history.

(56)       References Cited

U.S. PATENT DOCUMENTS

2015/0217418 A1*  8/2015  Yamashida ............ B23B 27/20
                                                      219/121.69
   2017/0157712 A1   6/2017  Doany et al.
   2017/0345849 A1* 11/2017  Kinoshita ........... H01L 27/1262

FOREIGN PATENT DOCUMENTS

KR    10-2015-0006098 A    1/2015
   KR    10-2015-0041457 A    4/2015
   KR       10-1538028 B1     7/2015
   KR    10-2017-0024251 A    3/2017

OTHER PUBLICATIONS

China Office Action in corresponding China Patent Application No. 201910260803.3, China Office Action dated Mar. 9, 2022 (6 pgs.).

* cited by examiner

LASER CUTTING APPARATUS AND METHOD AND METHOD OF MANUFACTURING DISPLAY PANEL BY USING LASER CUTTING METHOD

CROSS-REFERENCE TO RELATED APPLICATION

This application claims the benefit of Korean Patent Application No. 10-2018-0042195, filed on Apr. 11, 2018 in the Korean Intellectual Property Office, the entire disclosure of which is incorporated herein by reference.

BACKGROUND

1. Field

Aspects of one or more embodiments relate to an apparatus and method of cutting a portion of an object, such a display panel, a laser cutting method using the laser cutting apparatus, and a method of manufacturing a display panel by using the laser cutting method.

2. Description of Related Art

Generally, a display panel has a structure in which a display configured to display an image is arranged on a base substrate, an encapsulation substrate covers the display to protect the display, and a gap between the base substrate and the encapsulation substrate is sealed by a seal member.

In addition, when the display panel is manufactured, a process of cutting a portion of the encapsulation substrate for connecting the display to an external controller to expose a conductive wiring on the base substrate is performed. To do so, recently, cutting technology using an ultrashort laser such as a picosecond laser or a femtosecond laser is being developed.

However, when a cutting operation using the ultrashort laser is performed, the laser may not only cut the object, such as the encapsulation substrate, but also may damage elements in a periphery of the cut portion. That is, although the laser is used to penetrate the object and cut a portion of the object, part of the laser may pass through the object and be emitted to the elements in a periphery of the cut portion of the object, thus degrading the elements.

SUMMARY

According to aspect of one or more embodiments, a laser cutting apparatus may prevent a laser from damaging elements in a periphery of a cut portion, and a laser cutting method used by the laser cutting apparatus, and a method of manufacturing a display panel by using the laser cutting method are provided.

Additional aspects will be set forth, in part, in the description which follows and, in part, will be apparent from the description, or may be learned by practice of the presented embodiments.

According to one or more embodiments, a laser cutting method includes: providing a panel in which a second substrate is stacked on a first substrate including a conductive wiring; and removing a portion of the second substrate to expose the conductive wiring by emitting a laser beam to the second substrate, wherein the laser beam is emitted to the second substrate at an incident angle equal to or greater than a threshold angle at which total reflection occurs in the second substrate.

A refractive index of the second substrate may be about 1.5, and the threshold angle may be about 42 degrees.

A light guide may be arranged on the second substrate such that the laser beam passes through the light guide and is emitted to the second substrate.

The light guide may have a same refractive index as that of the second substrate. When an angle between an incident surface of the light guide on which the laser beam is incident and an incident surface of the second substrate on which the laser beam is incident is denoted as $\theta_0$, an incident angle at which the laser beam is emitted to the light guide is denoted as $\theta_1$, the threshold angle at which the laser beam is incident on the second substrate after refracting on the light guide at an angle $\theta_2$ is denoted as $\theta_c$, a refractive index of air is denoted as $n_1$, refractive indices of the light guide and the second substrate are denoted as $n_2$, the laser beam may be emitted to satisfy a condition $0 \leq \theta_1 \leq \mathrm{Arcsin}\ [n_2 \cdot \sin(\theta_0 - \theta_c)/n_1]$. A laser projected within a range of the incident angles may be incident to the second substrate with a reduced loss of reflection initially on a surface of an air/light guide and present in the second substrate due to total reflection.

The light guide may have a refractive index that is different from that of the second substrate. When an angle between an incident surface of the light guide on which the laser beam is incident and an incident surface of the second substrate on which the laser beam is incident is denoted as $\theta_0$, an incident angle at which the beam laser is emitted to the light guide is denoted as $\theta_1$, the threshold angle at which the laser beam is incident on the second substrate after refracting on the light guide at an angle $\theta_2$ is denoted as $\theta_c$, a refractive index of air is denoted as $n_1$, a refractive index of the light guide is denoted as $n_2$, and a refractive index of the second substrate is denoted as $n_3$, the laser beam may be emitted to satisfy a condition $0 \leq \theta_1 \leq \mathrm{Arcsin}\ [n_2 \cdot \sin\{\theta_0 - \mathrm{Arcsin}(n_3 \cdot \sin\theta_c/n_2)\}/n_1]$. A laser projected within a range of the incident angles may be incident to the second substrate with a reduced loss of reflection initially on a surface of an air/light guide and present in the second substrate due to total reflection.

The light guide integrally with the laser beam may scan the second substrate while relatively moving on the second substrate.

The light guide may be fixedly arranged on the second substrate to cover a whole cutting line on the second substrate, and the laser beam may scan the second substrate while relatively moving on the light guide.

The laser cutting method may further include spraying either water or an index matching liquid having a refractive index equal to or greater than that of the water between the light guide and the second substrate.

According to one or more embodiments, a method of manufacturing a display panel includes: providing a base substrate including a display and a conductive wiring configured to electrically connect the display to an external device, and a panel in which an encapsulation substrate covering the display is stacked on the base substrate; and removing a portion of the encapsulation substrate to expose the conductive wiring by emitting a laser beam to the encapsulation substrate, wherein the laser beam is emitted to the encapsulation substrate at an incident angle equal to or greater than a threshold angle at which total reflection occurs in the encapsulation substrate.

A refractive index of the encapsulation substrate may be about 1.5, and the threshold angle may be about 42 degrees.

A light guide may be arranged on the encapsulation substrate such that the laser beam passes through the light guide and is emitted to the encapsulation substrate.

The light guide may have a same refractive index as that of the encapsulation substrate. When an angle between an incident surface of the light guide on which the laser beam is incident and an incident surface of the encapsulation substrate on which the laser beam is incident is denoted as $\theta_0$, an incident angle at which the beam laser is emitted to the light guide is denoted as $\theta_1$, the threshold angle at which the laser beam is incident on the encapsulation substrate after refracting on the light guide at an angle $\theta_2$ is denoted as $\theta_c$, a refractive index of air is denoted as $n_1$, and refractive indices of the light guide and the second substrate are denoted as $n_2$, the laser beam may be emitted to satisfy a condition $0 \leq \theta_1 \leq \text{Arcsin } [n_2 \cdot \sin(\theta_0 - \theta_c)/n_1]$.

The light guide may have a refractive index that is different from that of the encapsulation substrate. When an angle between an incident surface of the light guide on which the laser beam is incident and an incident surface of the encapsulation substrate on which the laser beam is incident is denoted as $\theta_0$, an incident angle at which the beam laser is emitted to the light guide is denoted as $\theta_1$, the threshold angle at which the laser beam is incident on the encapsulation substrate after refracting on the light guide at an angle $\theta_2$ is denoted as $\theta_c$, a refractive index of air is denoted as $n_1$, a refractive index of the light guide is denoted as $n_2$, and a refractive index of the encapsulation substrate is denoted as $n_3$, the laser beam may be emitted to satisfy a condition $0 \leq \theta_1 \leq \text{Arcsin } [n_2 \cdot \sin\{\theta_0 - \text{Arcsin}(n_3 \cdot \sin \theta_c/n_2)\}/n_1]$.

The light guide integrally with the laser beam may scan the encapsulation substrate while relatively moving on the encapsulation substrate.

The light guide may be fixedly arranged on the encapsulation substrate to cover a whole cutting line on the encapsulation substrate, and the laser beam may scan the encapsulation substrate while relatively moving on the light guide.

The method may further include spraying either water or an index matching liquid having a refractive index equal to or greater than that of the water between the light guide and the encapsulation substrate.

According to one or more embodiments, a laser cutting apparatus includes a laser device configured to project a laser beam to an object to be cut; and a light guide configured to guide the laser beam to be refracted at least once before being incident on the object to be cut.

The light guide may be fixed to either the laser device or the object to be cut.

The laser cutting apparatus may be configured to spray either water or an index matching liquid having a refractive index equal to or greater than that of the water between the light guide and the object to be cut.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Reference will now be made in further detail to embodiments, some examples of which are illustrated in the accompanying drawings, wherein like reference numerals refer to like elements throughout. In this regard, the present embodiments may have different forms and should not be construed as being limited to the descriptions set forth herein. Accordingly, some embodiments are merely described below, by referring to the figures, to explain aspects of the present description. As used herein, the term "and/or" includes any and all combinations of one or more of the associated listed items.

As the present disclosure allows for various changes and numerous embodiments, some particular embodiments will be illustrated in the drawings and described in further detail in the written description. Effects and features of the present disclosure and methods of achieving the same will become apparent to those skilled in the art from the following detailed description which discloses various embodiments in conjunction with the accompanying drawings. The present disclosure may, however, be embodied in many different forms and should not be construed as being limited to the embodiments set forth herein.

Here, some embodiments will be described more fully with reference to the accompanying drawings. Like reference numerals in the drawings denote like elements, and, thus, their repeated description will be omitted.

As used herein, the singular forms "a," "an," and "the" are intended to include the plural forms as well, unless the context clearly indicates otherwise.

It is to be further understood that the terms "comprises" and/or "comprising" used herein specify the presence of stated features or components, but do not preclude the presence or addition of one or more other features or components.

It is to be understood that when a layer, region, or component is referred to as being "formed on" another layer, region, or component, it may be directly or indirectly formed on the other layer, region, or component. That is, for example, one or more intervening layers, regions, or components may be present.

When a certain embodiment may be implemented differently, a specific process order may be performed differently from the described order. For example, two consecutively described processes may be performed substantially at the same time or performed in an order opposite to the described order.

Figure 1:
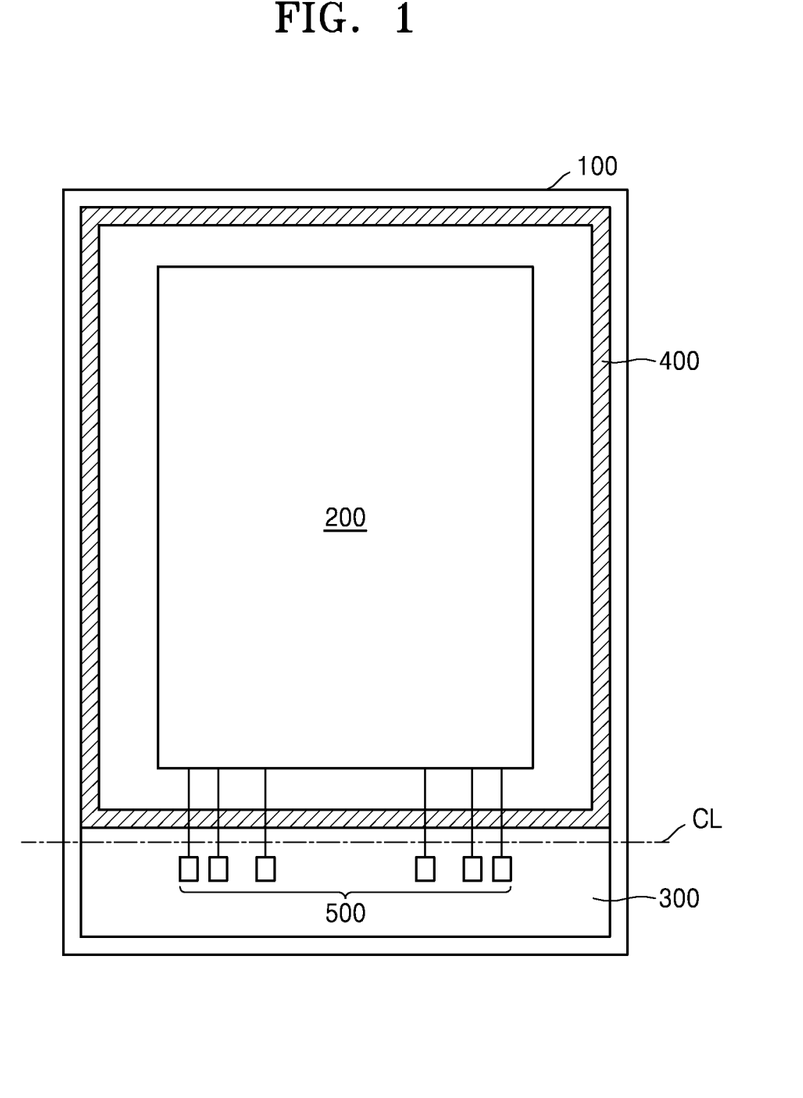
FIG. 1 is a plan view illustrating a display panel of which a portion is to be cut according to a laser cutting method of the present disclosure.

FIG. 1 is a plan view illustrating a display panel as an example of an object to be cut by using a laser beam according to a laser cutting method of the present disclosure.

As shown in FIG. 1, the display panel includes a first substrate 100 (e.g., a base substrate) on which a display 200 configured to display an image is arranged, a second substrate 300 (e.g., an encapsulation substrate) located on the first substrate 100 and covering the display 200, and a sealant 400 arranged between the first substrate 100 and the second substrate 300 and sealing a boundary of the display 200, for example.

In addition, a reference numeral 500 denotes a conductive wiring configured to electrically connect the display 200 to an external device, such as a controller. To connect the conductive wiring 500 to the external device, a portion of the second substrate 300 covering an upper part of the conductive wiring 500 is cut. The portion of the second substrate 300 covering the upper part of the conductive wiring 400 may be cut along a cutting line CL by using a laser cutting apparatus that is to be described later.

When a laser beam is emitted to the cutting line CL to cut the portion of the second substrate 300, the laser beam may also be emitted to the conductive wiring 500 below the second substrate 300, thus unintentionally damaging the conductive wiring 500. However, according to embodiments of the present disclosure, this damage may be prevented or substantially prevented.

Figure 2:
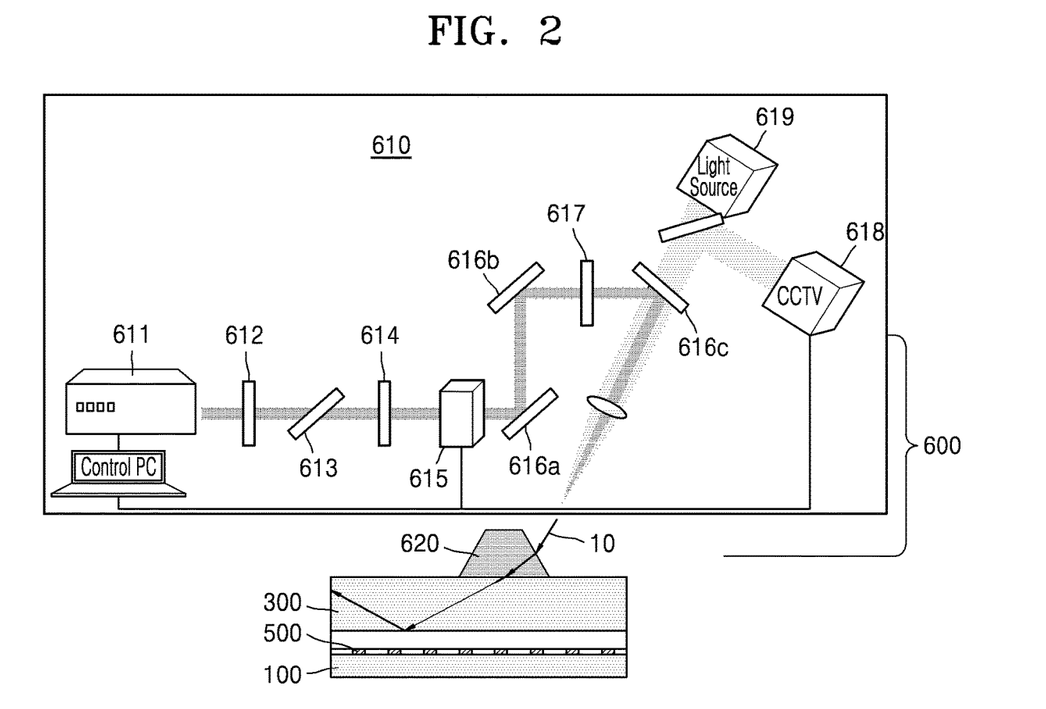
FIG. 2 is a schematic diagram of a laser cutting apparatus according to the present disclosure.

FIG. 2 is a schematic diagram of a laser cutting apparatus 600 according to the present disclosure.

As shown in FIG. 2, according to an embodiment, the laser cutting apparatus 600 includes a laser device 610 to project a laser beam 10, and a light guide 620 closely arranged on the second substrate 300 such that the projected laser beam 10 passes through the light guide 620 before being emitted to the second substrate 300 that is an object to be cut.

In an embodiment, the laser device 610 includes a laser generator 611 configured to generate an ultrashort laser such as a picosecond laser or a femtosecond laser, and a λ/2 plate 612, a polarizer 613, an attenuator 614, a pulse shaper 615, reflective mirrors 616a and 616b, a shutter 617, a half mirror 616c, a monitoring light source 619, a closed-circuit television (CCTV) 618, etc. which are sequentially arranged along an optical path.

The laser beam 10 projected from the laser device 610 is emitted to the light guide 620, refracts once at the light guide 620 and, then, is emitted to the second substrate 300. As such, the laser beam 10 is emitted to the second substrate 300 via the light guide 620 because an incident angle at which total reflection of the laser beam 10 occurs in the second substrate 300 may be easily formed by using the light guide 620. That is, when the emitted laser beam 10 is to cut the second substrate 300 instead of being emitted to the conductive wiring 500 below the second substrate 300, total reflection of the laser beam 10 may occur inside the second substrate 300 such that the laser beam 10 is not emitted to the outside of the second substrate 300. Such a total reflection condition may be implemented easily by using the light guide 620. A further detailed principle of the total reflection condition will be described with reference to FIG. 3. Prior to description of the total reflection condition, an internal structure of the display 200 connected to the conductive wiring 500 will be described briefly with reference to FIG. 7.

Figure 7:
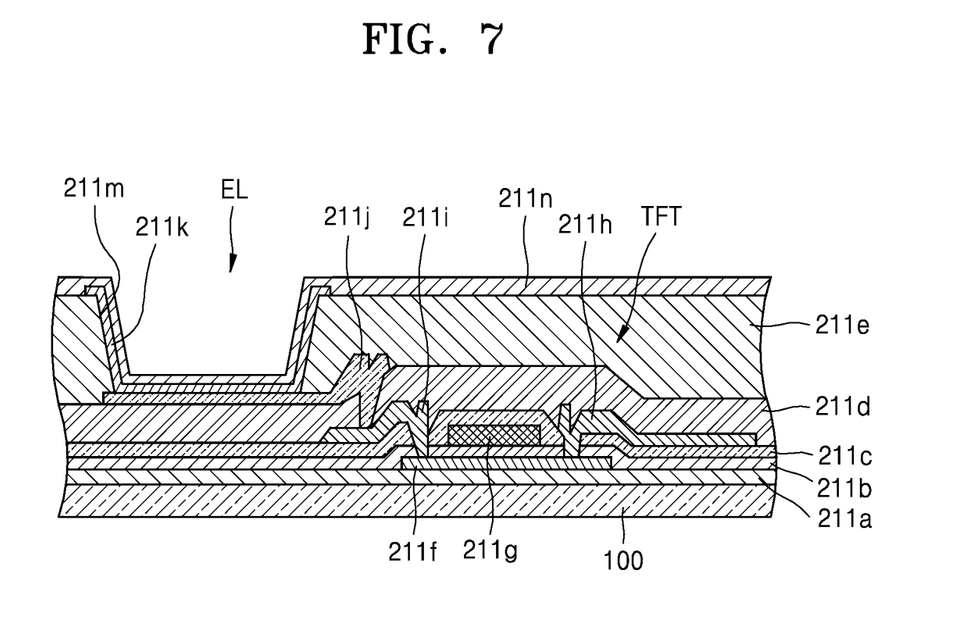
FIG. 7 is a cross-sectional view illustrating an internal structure of a display in the display panel of FIG. 1, according to an embodiment.

As shown in FIG. 7, in an embodiment, the display 200 has a structure in which a thin-film transistor TFT and an organic light-emitting device EL are stacked on the first substrate 100. In an embodiment, an active layer 211f is arranged on a buffer layer 211a on the first substrate 100. The active layer 211f has source and drain areas doped with a high concentration of an n-type or p-type impurity. The active layer 211f may be formed of an oxide semiconductor. For example, the oxide semiconductor may include an oxide of a material selected from Groups 12, 13, and 14 metallic elements, such as zinc (Zn), indium (In), gallium (Ga), tin (Sn) cadmium (Cd), germanium (Ge), and hafnium (Hf), or a combination thereof. For example, the active layer 211f may include G-I-Z-O[$(In_2O_3)a(Ga_2O_3)b(ZnO)c$] (where a, b, and c are respectively real numbers satisfying conditions a≥0, b≥0, and c>0). A gate electrode 211g is arranged above the active layer 211f having a gate insulating layer 211b arranged therebetween. A source electrode 211h and a drain electrode 211i are arranged above the gate electrode 211g. An interlayer insulating layer 211c is arranged between the gate electrode 211g and the source electrode 211h and the drain electrode 211i. A passivation layer 211d is arranged between the source electrode 211h and the drain electrode 211i and an anode electrode 211j of the organic light-emitting device EL.

An insulating planarization layer 211e is formed of acryl, or the like, on the anode electrode 211j. After an opening 211m is formed in the insulating planarization layer 211e, the organic light-emitting device EL is arranged.

In an embodiment, the organic light-emitting device EL displays certain image information by emitting red, green, or blue light according to a flow of electric current. The organic light-emitting device EL includes the anode electrode 211j connected to and configured to receive positive power from the drain electrode 211i of the thin-film transistor TFT, a cathode electrode 211n covering all pixels and configured to supply negative power, and a light-emitting layer 211k arranged between the anode electrode 211j and the cathode electrode 211n and configured to emit light.

A hole injection layer (HIL), a hole transport layer (HTL), an electron transport layer (ETL), an electron injection layer (EIL), etc. may be stacked adjacent to the light-emitting layer 211k.

In an embodiment, the light-emitting layer 211k may be arranged separately for each pixel such that pixels emitting red, green, or blue light form a unit pixel. In another embodiment, the light-emitting layer 211k may be arranged commonly over a whole pixel area regardless of locations of pixels. In this case, the light-emitting layer 211k may have a structure in which layers including light-emitting materials emitting red, green, or blue light are stacked vertically or mixed. When the light-emitting layer 211k emits white light, different colors may be also combined. In addition, the light-emitting layer 211k may further include a color conversion layer configured to convert white light to a color (e.g., a predetermined color), or a color filter.

In an embodiment, the light-emitting layer 211k is very fragile to moisture, and a thin-film encapsulating layer (not shown) in which an organic layer and an inorganic layer are alternately stacked may be arranged above the cathode electrode 211n to further protect the light-emitting layer 211k.

Figure 3:
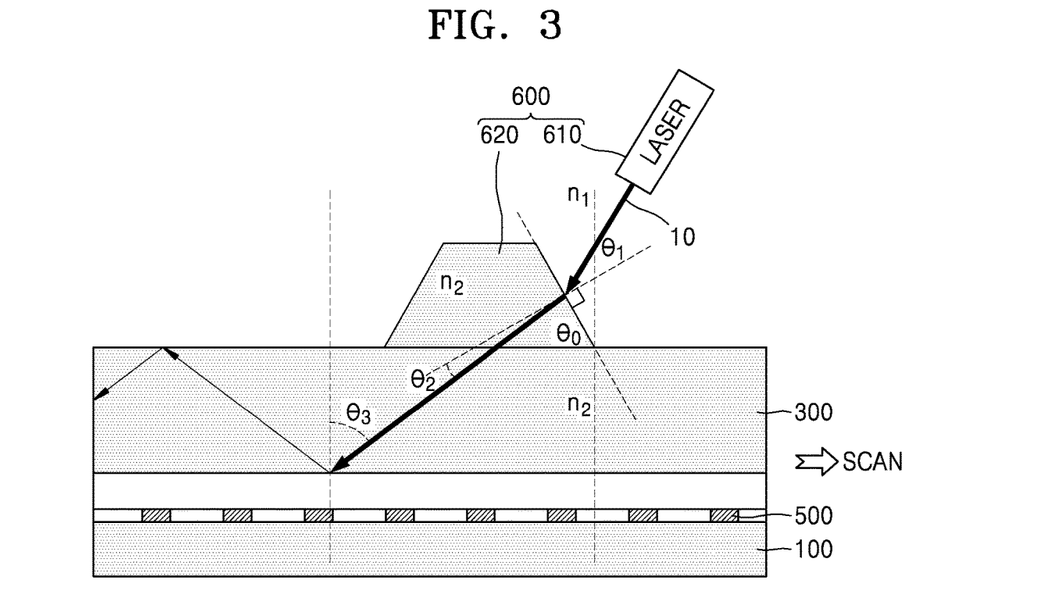
FIG. 3 is a cross-sectional view illustrating a moving path through which a laser beam emitted by the laser cutting apparatus of FIG. 2 moves in an encapsulation substrate, according to an embodiment.

The display 200 is connected to an external device via the conductive wiring 500. For this, a portion of the second substrate 300 is cut by emitting the laser beam 10 along the cutting line CL of FIG. 1, thus exposing the conductive wiring 500 to connect to the external device. As illustrated in FIG. 3, the laser cutting method according to the current embodiment may prevent or substantially prevent damage to the conductive wiring 500 by inducing total reflection of the laser beam 10 in the second substrate 300.

The display panel is an example of such an object that, when a laser beam is used to cut a portion of the object, other devices near the cut portion may be adversely affected. The laser cutting apparatus and method according to embodiments of the present disclosure may be used to cut not only the display panel. Herein, the laser cutting apparatus and method are described.

Referring to FIG. 3, the laser beam 10 projected from the laser device 610 is incident on an incident surface of the light guide 620 at an angle 81. Here, a refractive index of air is referred to as $n_1$, and refractive indices of the light guide 620 and the second substrate 300 are referred to as $n_2$. In other words, in an embodiment, the light guide 620 is formed of a material having a same refractive index as that of the second substrate 300.

Then, the laser beam 10 incident on the light guide 620 refracts at an angle $\theta_2$, and, then is incident into the second substrate 300 having a same refractive index as that of the light guide 620. When an incident angle incident into the second substrate 300 is $\theta_3$, it is determined according to an angle $\theta_3$ whether total reflection occurs. In other words, the angle $\theta_1$ at which the laser beam 10 is emitted to the light guide 620 may be adjusted such that the angle $\theta_3$ satisfies a condition under which total reflection may occur.

Figure 4A:
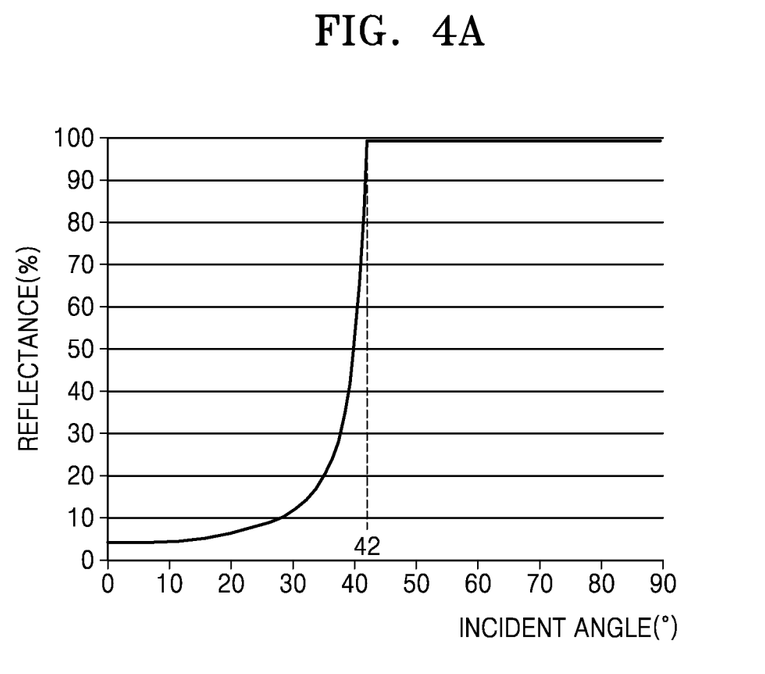
FIG. 4A is a graph showing a relation of reflectance with an incident angle on a bottom surface of the encapsulation substrate (a substrate to air interface)

A condition under which total reflection occurs in the second substrate 300 is indicated in a graph of an experiment shown in FIG. 4A. FIG. 4A is a graph showing a relation of reflectance with an incident angle on a bottom surface of the second substrate 300 (a substrate to air interface). That is, as the incident angle $\theta_3$ increases, a rate in which the laser beam 10 is reflected and remains inside the second substrate 300 instead of being emitted to the outside of the second substrate 300 gradually increases. It is understood that the reflectance gradually increases at an angle of about 0 degrees, and remarkably increases after an angle of about 30 degrees, and reaches 100% at an angle of about 42 degrees (here, a refractive index in the second substrate 300 is 1.5). When the incident angle $\theta_3$ is about 42 degrees or greater, total reflection substantially occurs, and the laser beam 10 does not have any influence on the conductive wiring 500.

Accordingly, a threshold angle $\theta_c$ at which total reflection occurs is about 42 degrees. Thus, when the incident angle $\theta_3$ is set to the threshold angle $\theta_c$ or greater, the laser beam 10 may remain in the second substrate 300, and thus, the conductive wiring 500 may be safely protected.

A value $\theta_1$ satisfying such a condition may be obtained by applying Snell's law. $\theta_0$ refers to an angle between an incident surface of the light guide 620 and that of the second substrate 300.

$$0 \le \theta_1 \le \text{Arcsin}[n_2 \cdot \sin(\theta_0 - \theta_c)/n_1]$$

Accordingly, when the laser beam 10 is emitted when a value of $\theta_1$ is set to satisfy the above condition, the incident angle $\theta_3$ with respect to the second substrate 300 is 42 degrees or greater and, thus, total reflection occurs. Then, the cutting operation may be safely performed without damaging the conductive wiring 500.

Figure 4B:
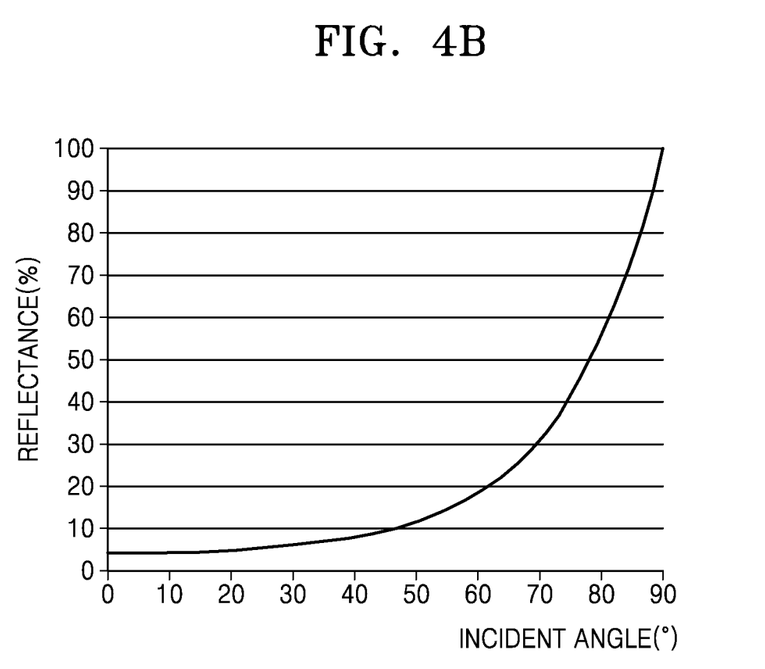
FIG. 4B is a graph showing a relation of reflectance with an incident angle on a top surface of the encapsulation substrate (an air to substrate interface)

As a reference, when the laser beam 10 is directly emitted to the second substrate 300 without using the light guide 620, the incident angle $\theta_3$ of about 42 degrees or greater may not be substantially implemented. In other words, when the incident angle $\theta_3$ is to be set to about 42 degrees or greater without using the light guide 620 such that total reflection occurs in an interface between a bottom surface of the second substrate 300 and air, an incident angle of the laser beam 10 incident on an upper surface of the second substrate 300 needs to be approximately 90 degrees near horizontal to the upper surface of the second substrate 300. However, in this case, as shown in the graph of FIG. 4B, since most of the laser beam 10 is reflected on the upper surface of the second substrate 300, that is, an interface from air to the second substrate 300, the laser beam 10 may not reach the inside of the second substrate 300. FIG. 4B is a graph showing a relation of reflectance with an incident angle on an upper surface of the second substrate 300 (an air to substrate interface). It is understood that half of the laser beam 10 or greater is reflected when the incident angle reaches 80 degrees or greater, and 100% of the laser beam 10 is reflected when the incident angle is approximately 90 degrees. In this case, an amount of an incident laser beam is insufficient, and, thus, the cutting operation may not be substantially performed.

However, in the current embodiment, when the laser beam 10 refracts once by using the light guide 620 and then reaches the second substrate 300, since an amount of the laser beam 10 that is incident on the second substrate 300 may be sufficient, the incident angle $\theta_3$ of 42 degrees or greater may be easily implemented. Accordingly, a sufficient amount of the laser beam 10 for the cutting operation may be incident and, at the same time, total reflection is induced. Thus, damage to the conductive wiring 500 near a portion to be cut may be effectively prevented.

As shown in FIG. 3, in an embodiment, the cutting operation may be performed by emitting a laser beam along the cutting line CL of FIG. 1 when the second substrate 300, that is, a panel is moving and the laser device 610 and the light guide 620 in the laser cutting apparatus 600 are fixed. In another embodiment, the cutting operation may be performed by emitting a laser beam when the second substrate 300 is fixed and the laser device 610 and the light guide 620 in the laser cutting apparatus 600 are moving.

In addition, a numerical aperture of a light emitter that is the laser device 610 may be adjusted to control a depth of a focus of the laser beam 10. Thus, a length for which energy is to be concentrated may be flexibly determined. In other words, when the numerical aperture increases, the depth of the focus of the laser beam 10 decreases. When the numerical aperture decreases, the depth of the focus of the laser beam 10 increases. For example, when energy is to be concentrated for a distance from an incident surface to an initial reflection surface of the second substrate 300, the numerical aperture may be adjusted such that the depth of the focus matches a length of the distance. However, since the laser beam 10 is emitted along the cutting line CL, the depth of the focus may not have to be set for a predetermined length at all times, but may be flexibly adjusted as needed.

Figure 5:
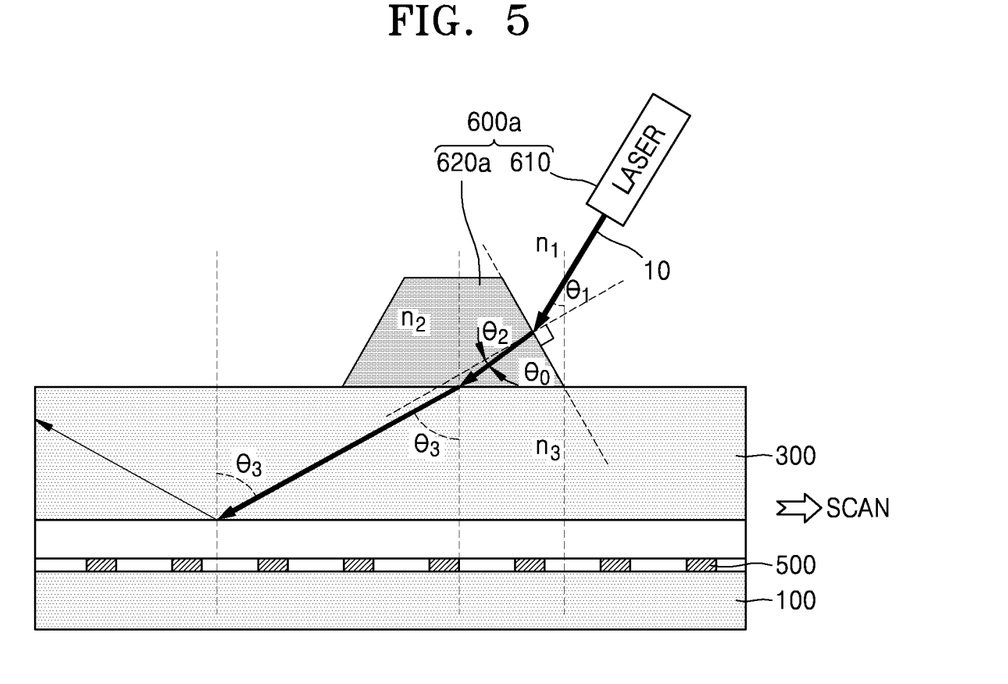
FIG. 5 is a cross-sectional view illustrating a moving path through which a laser beam emitted by the laser cutting apparatus of FIG. 2 moves in an encapsulation substrate, according to an embodiment.

In the embodiment described above, a case in which a refractive index of the light guide 620 is the same as that of the second substrate 300 is described. However, in another embodiment, as shown in FIG. 5, a light guide 620a having a refractive index different from that of the second substrate 300 may be used in a laser cutting apparatus 600a. In this case, refraction occurs on an incident surface of the light guide 620a and, then, occurs one more time on an interface between the light guide 620a and the second substrate 300. However, in this case, when the incident angle $\theta_3$ is set to be 42 degrees or greater, total reflection may occur. When Snell's law is applied, a condition may be obtained as follows.

$$0 \le \theta_1 \le \text{Arcsin}[n_2 \cdot \sin\{\theta_0 - \text{Arcsin}(n_3 \cdot \sin \theta_c/n_2)\}/n_1]$$

$n_1$ is a refractive index of air, $n_2$ is a refractive index of the light guide 620a, and $n_3$ is a refractive index of the second substrate 300.

Accordingly, even when the refractive index of the light guide 620a is not the same as that of the second substrate 300, total reflection of the laser beam 10 may be induced, and, thus, a stable cutting operation may be performed.

Figure 6:
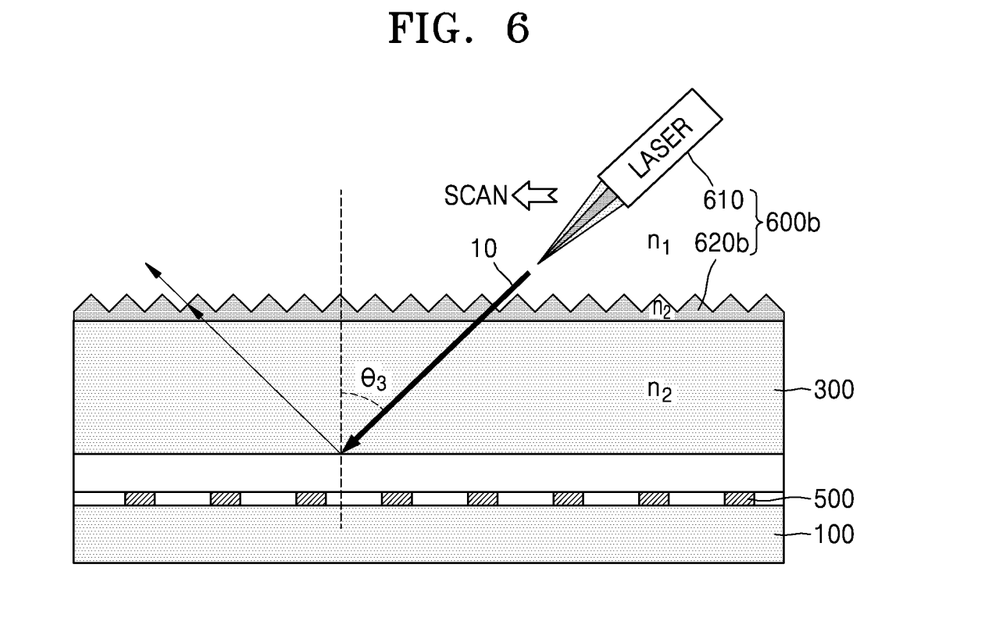
FIG. 6 is a cross-sectional view illustrating a light guide of a laser cutting apparatus according to another embodiment.

In the embodiments described above, an example in which the light guide 620 or 620a is fixed to and moves integrally with the laser device 610 to scan the second substrate 300 is described. In another embodiment, as shown in FIG. 6, in a laser cutting apparatus 600b, a light guide 620b covering the whole cutting line CL on the second substrate 300 may be used. That is, the light guide 620b covering the whole cutting line CL is prepared and arranged on the second substrate 300, and, then, only the laser device 610 scans the second substrate 300 to perform the cutting operation. In another embodiment, the second substrate 300 and the light guide 620b may integrally move and the fixed laser device 610 may emit a laser to the second substrate 300 to perform the cutting operation. As such, a form of the light guide 620b may be variously modified.

In an embodiment, a liquid may be sprayed to prevent or substantially prevent a void between the light guide 620, 620a, or 620b and the second substrate 300. In an embodiment, for example, water having a refractive index of 1.33 or an index matching liquid having a refractive index of 1.33 or greater is sprayed between the light guide 620, 620a, or 620b and the second substrate 300, and a void is prevented or substantially prevented, thus minimizing or reducing a change of the refractive index. Accordingly, an angle at which a laser is incident may be precisely controlled.

As described above, according to the laser cutting apparatus, the laser cutting method used by the laser cutting apparatus, and a method of manufacturing a display apparatus by using the laser cutting method, when an object, such as a display panel, is to be cut by using a laser beam, since a range of an incident angle may be controlled by using a light guide such that a projected laser is incident on the object with a reduced loss of reflection and present only in the second substrate in the object according to total reflection, the efficiency of energy used for the cutting operation may be increased and deterioration that may be caused by a laser beam on elements in a periphery of the object may be prevented or substantially prevented. Thus, product quality may be stably ensured even after the cutting operation is performed.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A laser cutting method comprising:
    providing a panel in which a second substrate is stacked on a first substrate comprising a conductive wiring; and
    removing a portion of the second substrate to expose the conductive wiring by emitting a laser beam to the second substrate,
    wherein the laser beam is emitted to the second substrate at an incident angle equal to or greater than a threshold angle at which total reflection occurs in the second substrate,
    wherein a light guide is arranged on the second substrate such that the laser beam passes through the light guide and is emitted to the second substrate, and
    wherein the light guide has a same refractive index as that of the second substrate.

2. The laser cutting method of claim 1, wherein a refractive index of the second substrate is about 1.5, and the threshold angle is about 42 degrees.

3. The laser cutting method of claim 1, wherein, when an angle between an incident surface of the light guide on which the laser beam is incident and an incident surface of the second substrate on which the laser beam is incident is denoted as $\theta_0$, an incident angle at which the laser beam is emitted to the light guide is denoted as $\theta_1$, the threshold angle at which the laser beam is incident on the second substrate after refracting on the light guide at an angle $\theta_2$ is denoted as $\theta_C$, a refractive index of air is denoted as $n_1$, refractive indices of the light guide and the second substrate are denoted as $n_2$, the laser beam is emitted to satisfy a condition $0 \leq \theta_1 \leq \operatorname{Arcsin}[n_2 \cdot \sin(\theta_0 - \theta_C)/n_1]$.

4. The laser cutting method of claim 1, wherein the light guide integrally with the laser beam scans the second substrate while relatively moving on the second substrate.

5. The laser cutting method of claim 1, wherein the light guide is fixedly arranged on the second substrate to cover a whole cutting line on the second substrate, and the laser beam scans the second substrate while relatively moving on the light guide.

6. The laser cutting method of claim 1, further comprising spraying either water or an index matching liquid having a refractive index equal to or greater than that of water between the light guide and the second substrate.

7. A method of manufacturing a display panel, the method comprising:
    providing a base substrate comprising a display and a conductive wiring configured to electrically connect the display to an external device, and a panel in which an encapsulation substrate covering the display is stacked on the base substrate; and
    removing a portion of the encapsulation substrate to expose the conductive wiring by emitting a laser beam to the encapsulation substrate,
    wherein the laser beam is emitted to the encapsulation substrate at an incident angle equal to or greater than a threshold angle at which total reflection occurs in the encapsulation substrate,
    wherein a light guide is arranged on the encapsulation substrate such that the laser beam passes through the light guide and is emitted to the encapsulation substrate, and
    wherein the light guide has a same refractive index as that of the encapsulation substrate.

8. The method of claim 7, wherein a refractive index of the encapsulation substrate is about 1.5, and the threshold angle is about 42 degrees.

9. The method of claim 7, wherein, when an angle between an incident surface of the light guide on which the laser beam is incident and an incident surface of the encapsulation substrate on which the laser beam is incident is denoted as $\theta_0$, an incident angle at which the laser beam is emitted to the light guide is denoted as $\theta_1$, the threshold angle at which the laser beam is incident on the encapsulation substrate after refracting on the light guide at an angle $\theta_2$ is denoted as $\theta_C$, a refractive index of air is denoted as $n_1$, and refractive indices of the light guide and the second substrate are denoted as $n_2$, the laser beam is emitted to satisfy a condition $0 \leq \theta_1 \leq \text{Arcsin } [n_2 \cdot \sin(\theta_0 - \theta_C)/n_1]$.

10. The method of claim 7, wherein the light guide integrally with the laser beam scans the encapsulation substrate while relatively moving on the encapsulation substrate.

11. The method of claim 7, wherein the light guide is fixedly arranged on the encapsulation substrate to cover a whole cutting line on the encapsulation substrate, and the laser beam scans the encapsulation substrate while relatively moving on the light guide.

12. The method of claim 7, further comprising spraying either water or an index matching liquid having a refractive index equal to or greater than that of water between the light guide and the encapsulation substrate.

* * * * *